United States Patent
Fuxman et al.

(10) Patent No.: US 8,423,568 B2
(45) Date of Patent: Apr. 16, 2013

(54) QUERY CLASSIFICATION USING IMPLICIT LABELS

(75) Inventors: Ariel D. Fuxman, Mountain View, CA (US); Anitha Kannan, Mountain View, CA (US); Andrew Brian Goldberg, Madison, WI (US); Rakesh Agrawal, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 388 days.

(21) Appl. No.: 12/560,427

(22) Filed: Sep. 16, 2009

(65) Prior Publication Data

US 2011/0066650 A1   Mar. 17, 2011

(51) Int. Cl.
G06F 7/00 (2006.01)
G06F 17/30 (2006.01)

(52) U.S. Cl.
USPC .......................................... 707/760; 707/770

(58) Field of Classification Search .......... 707/600–831; 709/224
See application file for complete search history.

(56) References Cited

U.S. PATENT DOCUMENTS

| | | | |
|---|---|---|---|
| 7,366,705 B2* | 4/2008 | Zeng et al. | 706/20 |
| 8,250,015 B2* | 8/2012 | Li et al. | 706/45 |
| 2004/0024769 A1* | 2/2004 | Forman et al. | 707/100 |
| 2004/0249808 A1 | 12/2004 | Azzam et al. | |
| 2005/0071465 A1* | 3/2005 | Zeng et al. | 709/224 |
| 2007/0078822 A1 | 4/2007 | Cucerzan et al. | |
| 2007/0124263 A1 | 5/2007 | Katariya et al. | |
| 2007/0294240 A1 | 12/2007 | Steele et al. | |
| 2008/0120276 A1 | 5/2008 | Chennavasin | |
| 2009/0313286 A1* | 12/2009 | Mishra et al. | 707/102 |
| 2010/0256969 A1* | 10/2010 | Li et al. | 703/16 |

OTHER PUBLICATIONS

Jing Bai et al., Using query contexts in information retrieval, Jul. 23-27, 2007, ACM, 15-22.*
Shen, et al., "A Comparison of Implicit and Explicit Links for Web Page Classification", retrieved at <<http://citeseerx.ist.psu.edu/viewdoc.download?doi=10.1.1.81.9487&rep=rep1&type=pdf>>, Proceedings of the 15th international conference on World Wide Web, May 23-26, 2006, pp. 643-650.
Castillo, et al., "Query-Log Mining for Detecting Polysemy and Spam", retrieved at <<http://www.chato.cl/papers/ccdfg_2008_polysemy_spam.pdf>>, Proceedings of the 4th international workshop on Adversarial information retrieval on the web, 2008, pp. 17-20.

(Continued)

*Primary Examiner* — Jean B Fleurantin
(74) *Attorney, Agent, or Firm* — Gonzalez Saggio & Harlan LLP

(57) ABSTRACT

Described is a technology for automatically generating labeled training data for training a classifier based upon implicit information associated with the data. For example, whether a query has commercial intent can be classified based upon whether the query was submitted at a commercial website's search portal, as logged in a toolbar log. Positive candidate query-related data is extracted from the toolbar log based upon the associated implicit information. A click log is processed to obtain negative query-related data. The labeled training data is automatically generated by separating at least some of the positive candidate query data from the remaining positive candidate query data based upon the negative query data. The labeled training data may be used to train a classifier, such as to classify an online search query as having a certain type of intent or not.

19 Claims, 3 Drawing Sheets

OTHER PUBLICATIONS

Guo, et al., "Exploring Client-Side Instrumentation for Personalized Search Intent Inference: Preliminary Experiments", retrieved at <<http://www.mathcs.emory.edu/~eugene/papers/ITWP2008_mouse_move.pdf>>, AAAI 2008 Workshop on Inteligent Techniques for Web Personalization (ITWP 2008), 2008, pp. 10.

Bai, et al., "Using Query Contexts in Information Retrieval", retrieved at <<http://www.iro.umontreal.ca/~baijing/Publication/SIGIR-2007.pdf>>, Proceedings of the 30th annual international ACM SIGIR conference on Reseach and development in information retrieval, 2007, pp. 15-22.

Beitzel, Steven M., "On Understanding and Classifying Web Queries", retrieved at <<http://cchen1.csie.ntust.edu.tw/students/2009/On%20Understanding%20and%20Classifying%20Web%20Queries.pdf>>, May 2006, pp. 96.

* cited by examiner

QUERY CLASSIFICATION USING IMPLICIT LABELS

BACKGROUND

Many types of queries are somewhat ambiguous as to the user's intent with respect to what search results the user is seeking. For example, when a user submits a query, it is not apparent to a conventional search engine whether the user wants results corresponding to a local search or to a wider (e.g., global) search. There are numerous other examples, e.g., cooking/recipe-intended or not, in which one user may want to receive search results with links to cooking-related websites while another does not.

As a more particular example, online shopping is a popular way of doing business. Many times a user who is interested in purchasing a product (or service) enters something about that product into a search engine. For example, a user interested in purchasing a camera will type something about a camera when requesting a search, such as "digital camera reviews" or "digital camera price comparison." However, not all users have commercial intent when requesting a search (e.g., "transfer pictures from a digital camera"). If it was possible to know whether or not a user had commercial intent when submitting a search, more relevant search results can be returned, which is both desirable to the user and lucrative to the search engine, shopping sites and manufacturer or service provider.

Algorithmically predicting a user's intent for a submitted query can be done to an extent, but this typically requires a large amount of high-quality training data to train a suitable classification (prediction) algorithm. Such training data needs to be labeled manually by judges as either intended or non-intended with respect to a classification class, based upon guidelines that define the meaning of intent.

As can be readily appreciated, manually creating such large scale datasets is extremely time-consuming, expensive, and error-prone. Notwithstanding, to be of value to a search engine, data labeling would need to be done often, because the labeled data may quickly become outdated. For example, in commerce, where new products are frequently introduced, a prediction algorithm would need to be regularly re-trained with new datasets. Labeling such new data in a timely manner was heretofore largely impractical and often not possible.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which labeled training data is automatically generated based upon implicit information associated with logged query data. Positive candidate query data is extracted from a first set of logged data (e.g., a toolbar log) based upon associated implicit information, e.g., portal information as to where a query was submitted that indicates that the query is likely part of an intended class. A second set of logged data (e.g., a click log) is processed to obtain negative query-related data. The labeled training data is automatically generated by separating at least some of the positive candidate query data from the remaining positive candidate query data based upon the negative query data.

Once the labeled training data is generated, the labeled training data may be used to train a classifier. The classifier may be used in online search query classification, e.g., to determine whether a query has a certain type of intent or not, e.g., commercial intent.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards automatically labeling training data as belonging to a particular class, based on data available to a search engine company, such as query ("click") logs and/or toolbar logs. In general, the automatic labeling is "implicit" based in part on where the query was entered. For example, if a query is entered at a commercial portal such as an online department store (shopping) website, that query is highly likely to have commercial intent (e.g., most of the users who type that query have the intention to buy a tangible product). In contrast, queries that result in clicking a link to a reference related (e.g., online encyclopedia) website, for example, are highly likely to have non-commercial intent. By processing such implicit information, a query can be classified and thus labeled as being in one class (e.g., having intent) or another class (non-intent), or classified as uncertain as to its intent.

The automatically labeled training data may be used to train a classifier, from which an online search engine obtains information (basically a "hint") that is useable in obtaining likely more relevant search results for an online query. Training the classifier is a supervised machine learning problem; the learning algorithm learns a decision boundary from a set of labeled queries (training data), so that it can accurately predict the intent of any given query. Note that in one implementation, the labels for queries are automatically obtained.

It should be understood that any of the examples herein are non-limiting. For example, while determining commercial intent is exemplified throughout as one use of implicit labeling, any type of classification based upon some implicit information (e.g., the portal in which a query was entered) may benefit from implicit labeling. Moreover, while two distinctions (e.g., either intended or non-intended) are described for labeling training data, along with detecting queries of an ambiguous "class" that overlap, it is understood that more than two classifications are possible for labeling training data; for example, "local," "regional," "national" and "global," as well as "ambiguous," is one possible way in which various training data may be classified and labeled based upon some implicit information.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, training data labeling and search technology in general.

Figure 1:
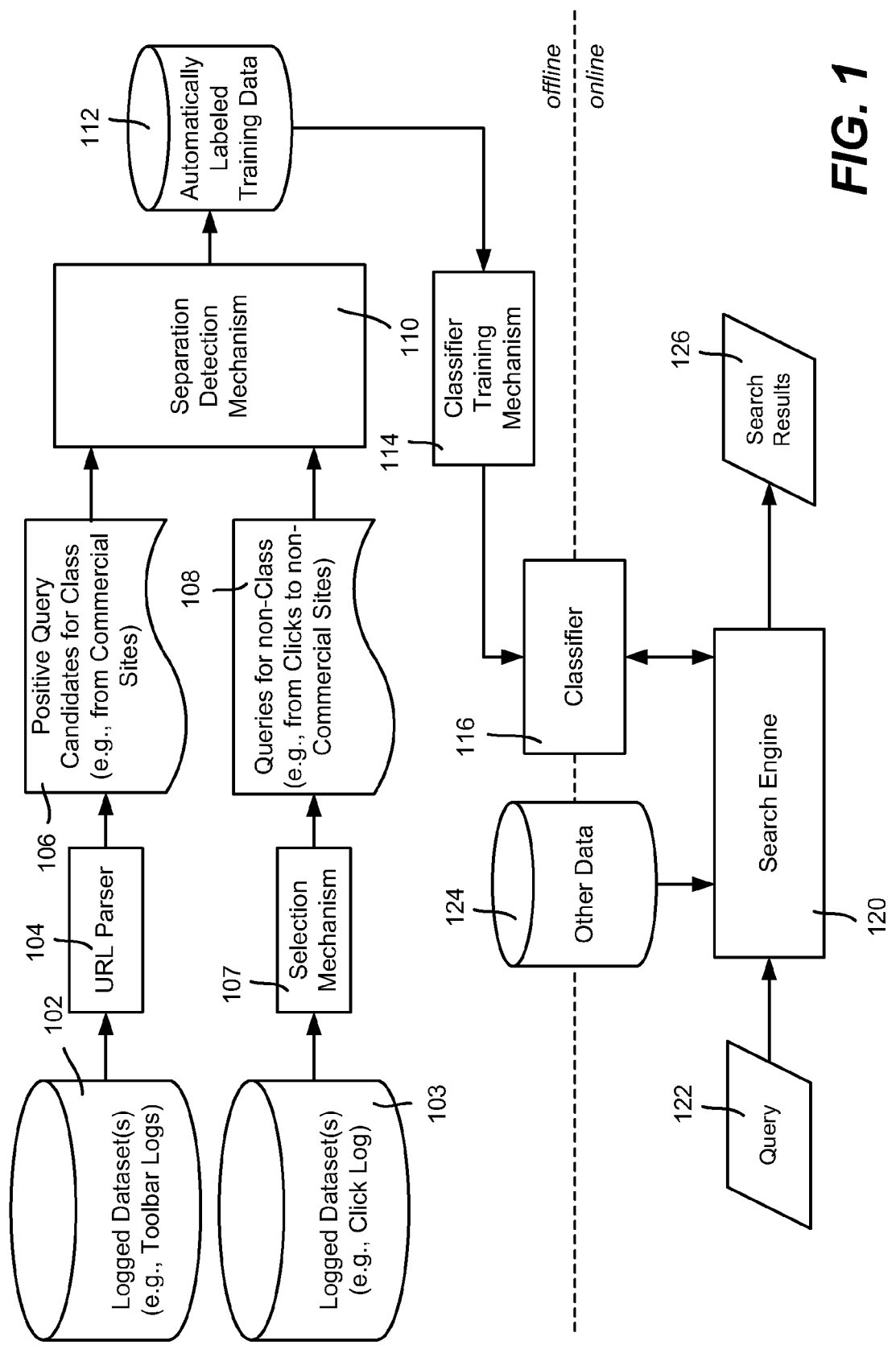
FIG. 1 is a block diagram representing example components for automatically labeling training data based upon implicit information for use in training a classifier.

Turning to FIG. 1, there is shown a block diagram representing example components for constructing training sets from available datasets 102 and 103. The training data are obtained in an automated fashion from the datasets available to a search engine company, such as toolbar logs and query logs. As will be understood, labeling is automatic and does not require any manual labeling.

The queries in the one or more logged datasets 102, which have some implicit information associated with them, have one or more keywords and possibly other data extracted by a URL parser 104. More particularly, the queries that are likely positive with respect to the intent may be found from queries that are issued on the search boxes of special-purpose portals. For example, if a query is issued in search box of an online department store (e.g., MSN shopping), an online classified advertisement site or a product price-finding site, it is very likely that the query had commercial intent. Access to such queries and their portals is available by processing a toolbar log, that is, the dataset 102, which is recorded for a vast number of users who have such a toolbar installed.

In general, the parser 104 extracts keywords from the URLs that are logged in the dataset 102. As an example, consider that a user types "zune" on a shopping portal, e.g., of some online department store herein exemplified as xyz.com. Then, a URL such as the following may be generated and recorded in the toolbar log:

http://www.xyz.com/s/ref=nb_ss_gw?url=search-alias%3Daps&field-keywords=zune

This URL is parsed by the URL parser 104, which extracts the keyword "zune". Thus, the above query that includes "zune" is evidence that a query containing "zune" has commercial intent and is thus a good candidate 106 for the training set labeled as having commercial intent, that is, contains the positive label with respect to being in that class. This single sample is not definitive, however, and thus additional processing is performed to make a final determination, as described below.

One other advantage of using toolbar logs is that a number of queries are associated with particular metadata information which further validates the intention. For example, if the user first selects the category "Electronics" on xyz.com and then types "zune" into the search box, a URL such as the following is recorded in the toolbar log:

http://www.xyz.com/s/ref=nb_ss_gw?url=search-alias%3Delectronics&field-keywords=zune&x=14&y=9

As another example, for the scenario of identifying whether a query has local intent, the origin of the query (location origin) may be leveraged as the metadata to create groups.

The user's explicit selection of the "Electronics" category reinforces the determination that the query has commercial intent. If present, the parser 104 also extracts this category, which may be used for separating the queries into groups, for example. Alternatively, if not used for grouping, such reinforced queries may be weighted higher than non-reinforced queries when later making a final determination as to whether to label the training data as positive with respect to being in the intended class, for example.

Thus, by examining the toolbar log of a web browser, the system is able to obtain positive query candidates 106 by selecting keywords from the queries that users pose on the search boxes of different portals. This efficiently provides very large amounts of labeled training data with no additional overhead cost.

In one implementation, both positive and negative datasets are used to ensure that any labeled training data (e.g., intended to be in a class or not) are not ambiguous. For example, a query such as "World War I" may have commercial intent, as a user may be seeking books and movies, but alternatively the user typing such a query may be seeking historical information. Such a query is likely ambiguous and thus is not a good candidate for commercial intent training data, as it is could be classified as positive or negative with respect to commercial intent.

Thus, in order to train a classifier with reasonable accuracy, a set of queries that are very likely not part of the intended class is also used in training, that is, by processing the dataset 103. By way of example, to find queries that do not have commercial intent, a source of reference material, such as an online encyclopedia may be considered. This is because such a reference source/site is typically used for research or informational tasks that do not have commercial intent.

In the "commercial-intent-or-not" example, any query that returned search results that subsequently resulted in a large number of clicks to such non-commercial sites gives an indication that such a query is non-commercial. Thus, to obtain queries (e.g., keywords of the queries) related to informational sites, click logs rather than toolbar logs may be used to select queries that are negative with respect to the classification. Note that users often access such sites through a general-purpose search engine rather than the search box of informational sites.

As represented in FIG. 1, a selection mechanism 107 can be used to select a set of queries 108 that are likely not in the class based upon clicks to non-commercial sites. Selection may further consider popularity of the query to eliminate atypical queries. For example, in one implementation, only queries having high relative frequencies of the different URLs (e.g., the fraction of all clicks for the query that are on the URL) are selected.

Turning to another aspect referred to as the separation property, to be considered unambiguous, the datasets 102 and 103 need to provide either positive or negative examples, but not both. To ensure that high quality data is obtained, a separation detection mechanism 110 determines whether there is sufficient "distance" between candidate queries implicitly labeled as in the intended class from those that correspond to the non-intended class.

When categories (corresponding to groups) are available, the separation detection mechanism 110 may make use of the categories associated with the queries, which may be extracted, for example, from the toolbar logs as described above. More particularly, the positive example candidates 106 may be separated into groups if possible (e.g., by clustering or using available metadata). The frequency distribution of features (e.g., number of occurrences in the class) is computed for each group. Then, the separation detection mechanism 110 compares the distributions of each group against the distribution of the negative example queries/data 108, and keeps only those groups whose distribution is highly divergent with respect to the negative distribution. Groups of examples too similar to the negative class are discarded.

More particularly, for each category, the separation detection mechanism 110 compares the frequency distributions of query words in that category with respect to the source of non-intended queries, e.g., the encyclopedia source. The frequency distribution of query words, P(w|C), in a category C is defined as the fraction of times that the word appears in that category:

$$P(w \mid C) = \frac{\text{number of occurrences of } w \text{ in class } C}{\text{total count of words in class } C}$$

If the word frequency distribution of an intended (e.g., commercial) category and the word frequency distribution of a non-intended (e.g., non-commercial) category are similar, then the queries in that category may be ambiguous. Various ways of measuring similarity may be used; one way uses Jensen-Shannon (JS) divergence, which is a symmetrized and smoothed version of the Kullback-Leibler (KL) divergence. This smoothed version of the KL divergence provides a good estimate of the divergence, as it takes into account the non-overlapping words in the vocabulary of the two distributions under consideration. The Jensen-Shannon divergence between two distributions P and Q is given by:

$$JS(P, Q) = \frac{1}{2}(KL(P \| M) + KL(Q \| M))$$

where M is the average distribution computed as:

$$M = \frac{1}{2}(P + Q),$$

and KL is the KL-divergence between the two distributions, computed as:

$$KL(P \| Q) = \sum_w P(w) \log \frac{P(w)}{Q(w)}.$$

By way of an actual example, in practice categories such as "Books", "DVDs" and "VHS" have low divergence in both sources, which is likely because the queries for these categories (mostly book or film titles) are ambiguous, as their vocabulary can be easily confused with the vocabulary of general non-commercial queries. In contrast, high divergence categories contain words that refer to brand names, models, and the like. Pruning out the lowest divergence queries has been found to lead to a significant improvement in the performance of the resulting classifier.

Note that for some applications and/or some data sources, it may not be appropriate to subdivide the candidate positive examples into groups. In such a situation, the distribution of the entire set of positive examples is compared to the distribution of the negative examples.

Following separation detection, the result is a set of labeled training data 112 automatically labeled from the implicit information, that is, the positive candidates (keyword sets or category groups) that remain after discarding candidates based upon the negative data. Note that it is feasible to use the negative data as well in training.

Then, given the labeled training data 112, an appropriate training mechanism 114 for that type of classifier trains the classifier 116; such training mechanisms are well known. Note that while any suitable classifier may be used, such as a classifier based on logistic regression, the training data creation technique is independent of the classifier used.

Once trained as represented in FIG. 1, the classifier 116 (classification/prediction algorithm) may be used by a search engine 120 in handling an online query 122. Other data 124 and the like may also be used by the search engine in conjunction with the classifier 116 to find and/or rank relevant search results 126.

Figure 2:
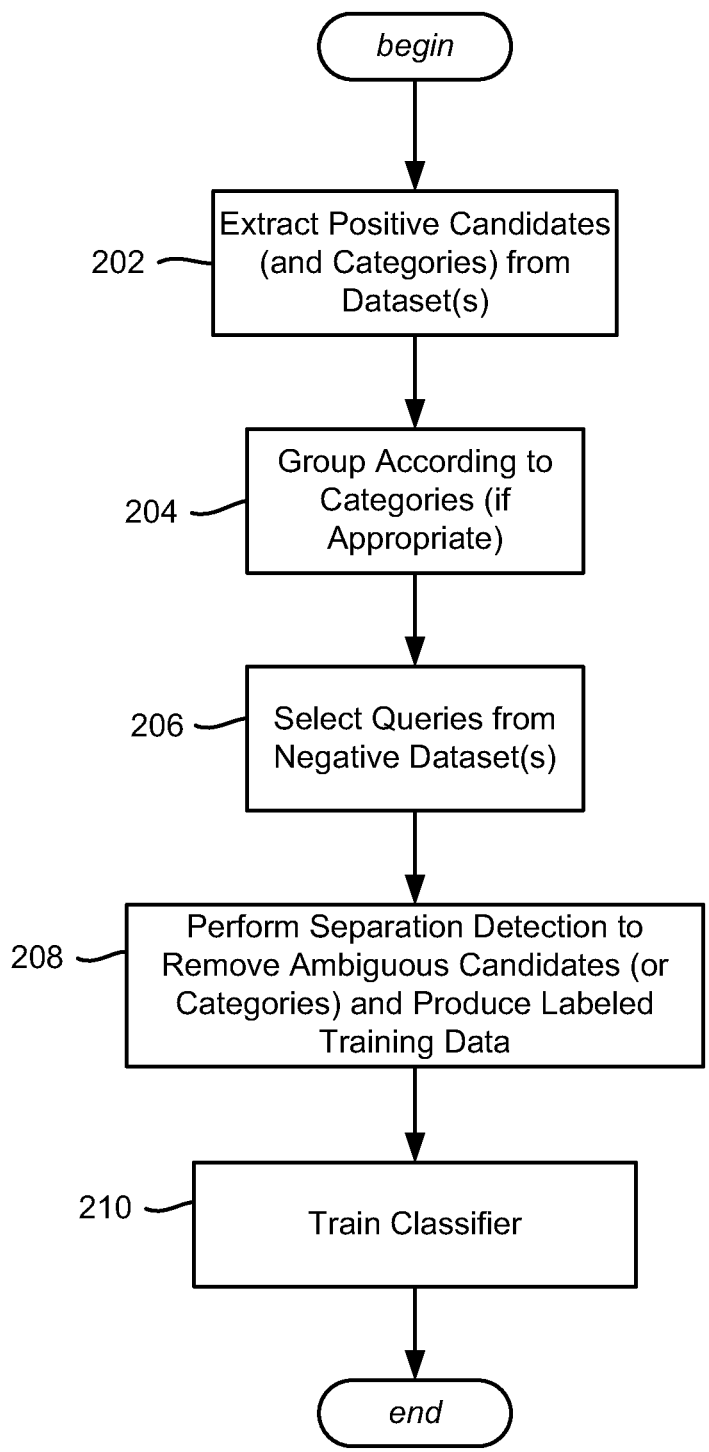
FIG. 2 is a flow diagram showing example steps for automatically labeling training data.

FIG. 2 summarizes the steps to automatically obtain the implicitly labeled training data, beginning at step 202 which represents extracting the candidate queries from the positive dataset or datasets, e.g., via URL parsing of the toolbar logs as described above. If available, category data is also extracted for grouping at step 204.

Step 206 represents selecting the negative queries, e.g., from the click log or logs. As described above, frequency-based selection may be performed.

Step 208 represents the separation processing that removes positive candidates (keyword sets of one or more keywords and/or candidate categories) based upon being too close in similarity with the negative examples. The result is automatically generated labeled training data, which is used to train a classifier at step 210.

As can be readily appreciated, the above approach to obtaining labeled training data is highly scalable. Moreover, additional labeled training data may be obtained on an ongoing basis and used to re-train the classifier, e.g., at regular intervals, to keep the classifier up to date. Note that the classifier may be fully re-trained, and/or may be incrementally updated over time, as new implicitly-labeled data becomes available. For example, the latest products available in the market are quickly reflected in the queries posed on commercial portals. By processing these queries through the toolbar logs, the training data is time-sensitive.

Exemplary Operating Environment

Figure 3:
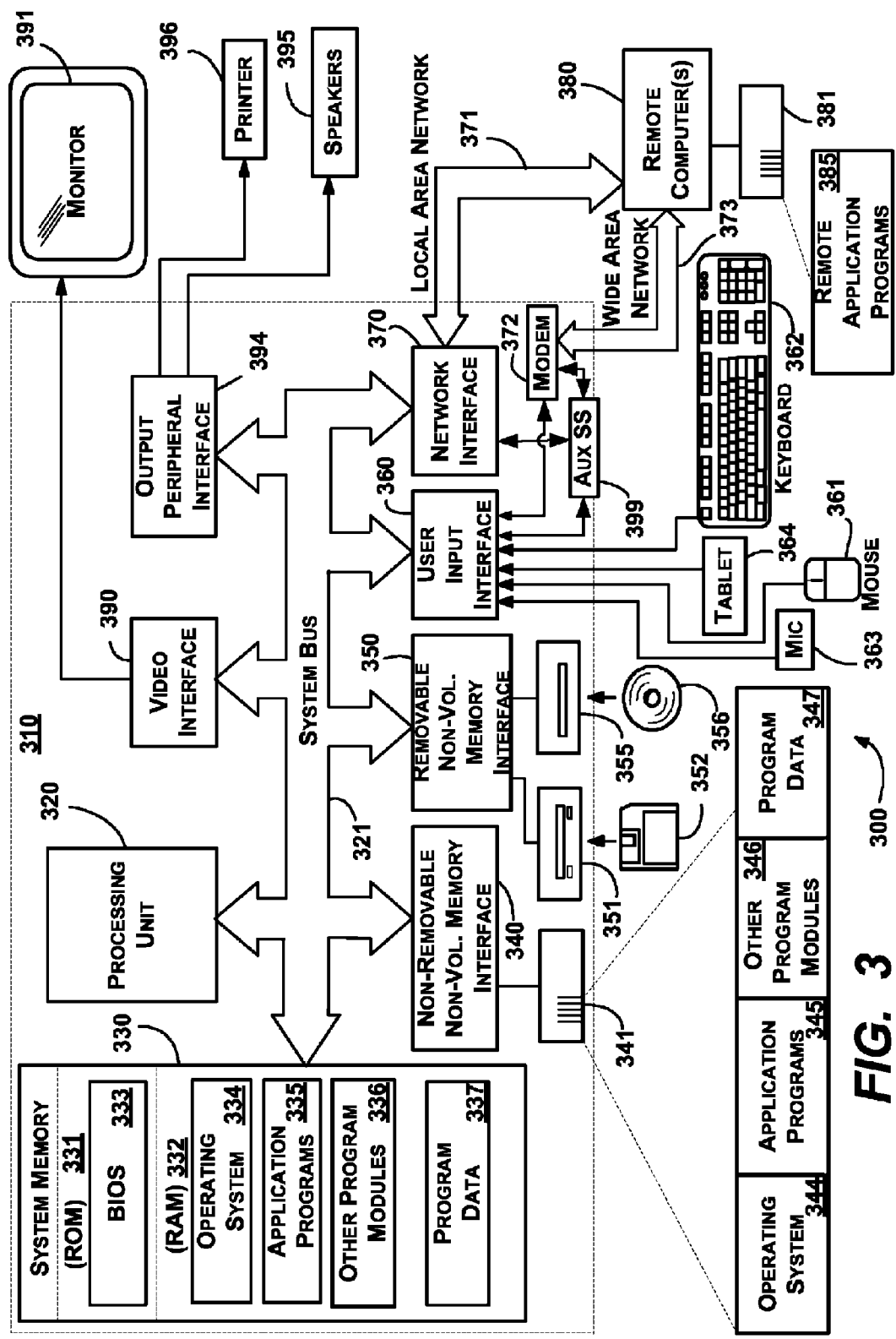
FIG. 3 shows an illustrative example of a computing environment into which various aspects of the present invention may be incorporated.

FIG. 3 illustrates an example of a suitable computing and networking environment 300 on which the examples of FIGS. 1 and 2 may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
automatically generating labeled training data based upon implicit information associated with logged data, including by processing the logged data, wherein processing the logged data comprises obtaining positive query-related data based upon queries entered in at least one specified portal in a plurality of portals, selecting negative queries from other logged data, and detecting whether any positive query-related data are ambiguous based upon similarity with negative data corresponding to the negative queries that are too similar to the positive data, wherein the logged data comprises a plurality of queries entered at the plurality of portals, and wherein the implicit information comprises an identification of a portal in the plurality of portals at which a query in the plurality of queries was entered; and
using the labeled training data to train a classifier.

2. The method of claim 1 wherein the at least one specified portal in the plurality of portals comprises a commercial portal, wherein obtaining the positive query-related data comprises extracting keyword sets from queries entered at the commercial portal, and wherein automatically generating the labeled training data comprises labeling the positive query-related data as having commercial intent.

3. The method of claim 1 further comprising: responsive to a determination that any positive query-related data are ambiguous based upon similarity with the negative data corresponding to the negative queries that are too similar to the positive data, removing from the labeled training data those positive query-related data that are too similar.

4. The method of claim 3 further comprising extracting categories from the logged data, grouping positive query related data by categories, and removing categories that are too similar.

5. The method of claim 1 wherein detecting whether any positive query-related data are ambiguous based upon similarity comprises computing frequency distributions.

6. The method of claim 1 wherein processing the logged data comprises accessing at least one toolbar log, and wherein selecting the other logged data comprises accessing at least one click log.

7. The method of claim 1 further comprising, using the classifier to classify an online query.

8. In a computing environment, a system comprising:
a processor;
a parser, implemented on the processor, that extracts query-related candidate data from logged uniform resource locator data, in which at least a subset of the logged uniform resource locator data is associated with implicit information that indicates the query-related candidate data is possibly positive with respect to a classification class, and wherein the implicit information corresponds to at least one portal at which queries are entered;
a selection mechanism that selects negative query-related data associated with other logged uniform resource locator data; and
a separation detection mechanism that generates automatically labeled training data from the query-related candidate data by removing ambiguous candidate data that is too similar to negative query-related data.

9. The system of claim 8 wherein the at least one portal comprises a commercial portal, wherein obtaining the positive query-related data comprises extracting keyword sets from queries entered at the commercial portal, and wherein automatically generating the labeled training data comprises labeling the positive query-related data as having commercial intent.

10. The system of claim 8 wherein the parser extracts a keyword set comprising at least one keyword from the uniform resource locator to obtain at least part of the query-related candidate data.

11. The system of claim 8 wherein the parser extracts a category from the uniform resource locator to obtain at least part of the query-related candidate data.

12. The system of claim 11 further comprising means for grouping query-related candidate data based on a category.

13. The system of claim 8 wherein the implicit information that indicates the query-related candidate data is possibly positive with respect to a classification class comprises information that indicates that the query-related candidate data likely has commercial intent.

14. The system of claim 8 wherein the logged uniform resource locator data comprises at least one toolbar log, and wherein the other logged uniform resource locator data comprises at least one click log.

15. The system of claim 8 further comprising a classifier that is trained from the automatically labeled training data.

16. One or more computer-readable storage media storing computer-executable instructions, which in response to execution by a computer, cause the computer to perform steps, comprising:
automatically generating labeled training data based upon implicit information associated with logged data, including by processing the logged data, wherein processing the logged data comprises obtaining positive query-related data based upon queries entered in at least one specified portal in a plurality of portals, selecting negative queries from other logged data, and detecting whether any positive query-related data are ambiguous based upon similarity with negative data corresponding to the negative queries that are too similar to the positive data, wherein the logged data comprises a plurality of queries entered at the plurality of portals, and wherein the implicit information comprises an identification of a portal in the plurality of portals at which a query in the plurality of queries was entered; and using the labeled training data to train a classifier.

17. The one or more computer-readable media of claim 16 having further computer-executable instructions, comprising:

grouping the positive query-related data by category data extracted from the logged data.

18. The one or more computer-readable media of claim 16 having further computer-executable instructions, comprising, training a classifier with the labeled training data.

19. The one or more computer-readable media of claim 16 having further computer-executable instructions, comprising, using the classifier to classify an online search query.

* * * * *